Aug. 31, 1937. G. P. HEPPES 2,091,361
METHOD FOR SURFACE DECORATION OF A PLASTIC
Filed July 5, 1932
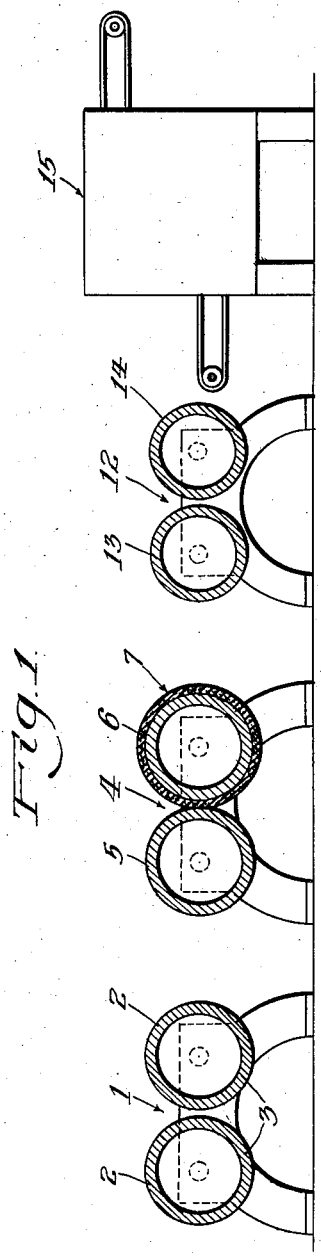
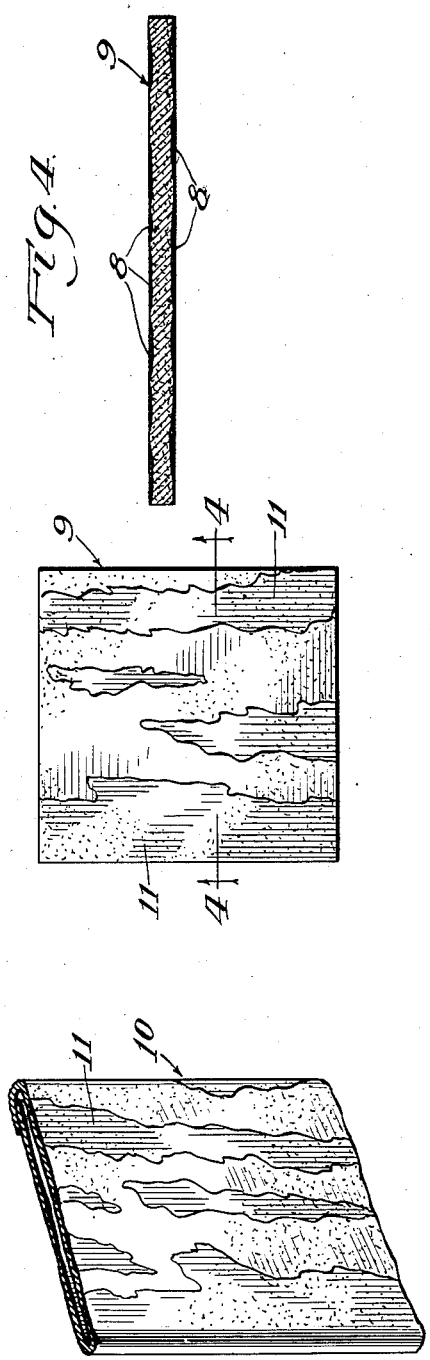
Inventor:
George P. Heppes,
By Frank L. Belknap
Attorney.

UNITED STATES PATENT OFFICE 2,091,361

METHOD FOR SURFACE DECORATION OF A PLASTIC

George P. Heppes, Chicago Heights, Ill., assignor to The Tile-Tex Company, Chicago Heights, Ill., a corporation of Illinois Application July 5, 1932, Serial No. 620,841

10 Claims. (Cl. 18—48.8)

This invention relates more particularly to a marbleized composition tile and to the method of making same wherein the configurations or marble patterns appear upon the exposed surfaces of the finished product but the material comprising said patterns does not extend to an appreciable depth into the thickness of the tile.

In the manufacture of marbleized composition tile, as heretofore practiced, the base material, that is, the material comprising the body of the tile, usually composed of suitable proportions of a binder, filler and pigment, was intimately mixed with the marbleizing stock, usually composed of a binder and filler and tinted with a pigment differing in color from that of the base material. The mixing step comprised vigorously mixing or milling the two stocks until the resulting mass reached a condition of relatively uniform texture. With careful mixing or milling tile may be produced which possesses exposed surfaces resembling marble as to the whorls, configurations or streaks.

However, since the basic materials comprising the body and marbleizing stock, that is, the filler and binder of each usually possess like characteristics, the materials differing only in color, extreme care and skill must be exercised in milling the materials to produce a product which will possess relatively uniform characteristics as to appearance. If the materials are mixed too long or are too vigorously milled, the resulting product may not be characterized by the streaks or configurations of marble but may possess a nondescript appearance not remotely resembling marble but being of a color distinct and different from either the base or marble pigments. If insufficiently mixed or milled, the streaks and whorls may be exaggerated, the resulting product possessing irregular, unsightly smears. Between these two extremes, varying degrees of characteristic appearances may be produced which are extremely difficult to reproduce in successive batches, necessitating the laborious task of matching the finished tiles before merchandising the same.

A further disadvantage also inherent in the processes heretofore practiced resides in the fact that the marbleizing material is mixed throughout the thickness of the finished tile, whereas only that portion of the marbleizing stock visible from the exposed surfaces imparts any useful function. The proportion of marbleizing stock to base material varies between 20 to 40 percent, whereas ultimately but a small proportion thereof contributes to a useful purpose. This necessitates the separate preparation of a relatively large quantity of marbleizing stock which must often be prepared concurrently with the base material, bringing into use more than one piece of apparatus.

Moreover, trimmings or cuttings from the presses punching the finished product into blocks or tiles of desired dimensions cannot be returned to the mixing machine or mill without very quickly so influencing the color of the base material as to necessitate a change of pigment proportions.

By utilizing my invention these hereinbefore mentioned disadvantages are overcome. Only a relatively small proportion of marbleizing stock is necessary (generally less than 10%) substantially all of which contributes to the characteristic appearance of the resultant tile. The marbleizing material is applied only to the surface of the base mass from which the tile is constructed after said mass has been thoroughly milled and, hence, a final product of uniform appearance may be produced eliminating the necessity of subsequently sorting or matching. The trimmings or waste from the presses may be returned to the base mass during the period of milling the same and, due to the relatively small proportion of marbleizing stock contained in the trimmings, the dilution of the color of the base, due to reworking of scrap material, is negligible. In addition, the mill can be operated continuously during the marbleizing operation.

Another advantage resides in the pleasing marbleizing effect obtained, as to the type and swirl of the marbleizing colors, due to control of the quantity and application of same.

As another advantage there is only a slight reduction in the rate of production due to making marbleizing stock prior to mixing base material. This will be appreciated since my process uses approximately 20% as much marbleizing stock as has heretofore been used. This means that only one fifth of the time is required to produce the marbleizing stock and the apparatus is freed for the working of base stock.

Other objects and advantages of my invention will be apparent from the accompanying drawing and following detail description.

In the drawing, Fig. 1 is a diagrammatic side elevational view of one form of apparatus suitable for carrying out my invention.

Fig. 2 is a detail perspective view of the plastic mass subsequent to application of the marbleizing stock.

Fig. 3 is a top plan view of the finished marbleized tile.

Fig. 4 is a sectional view taken on the line 4—4 of Fig. 3.

Referring more in detail to the drawing, 1 indicates a mixing unit or mill comprising rolls 2 which may be provided with hollow interiors 3 through which steam or other heating medium may be passed. The unit 1 may be adapted to mix the base material which may comprise a filler, a binder and a pigment. The filler may be asbestos or other material possessing like characteristics and the binder may be artificial asphalt, gilsonite or the like.

If asbestos and gilsonite are used the gilsonite may be ground, mixed with asbestos fibres and introduced into the unit 1 with a suitable pigment. The temperature of the rolls 2 may be maintained slightly below the melting point, but sufficient to soften, said gilsonite. The mixture may be thoroughly worked, periodically stripped from the rolls and reworked in said mixing unit until a uniform texture and color is obtained, the heated rolls serving to soften the gilsonite and render the mixture plastic or dough-like.

The plastic mass may then be stripped from the rolls 2 by means of suitable stripping knives (not shown) and said mass may be introduced into the second mixing unit 4. The mixing unit 4 may comprise rolls 5 and 6 which may be of hollow construction similar to rolls 2 of the unit 1, whereby steam or other heating fluid may be utilized to heat said rolls. Roll 6 may rotate at a greater angular velocity than roll 5 and may be maintained at a relatively lower temperature. Consequently, the plastic mass adheres to the roll 6 in the form of a layer, as shown best at 7 in Fig. 1.

The marbleizing stock may comprise a filler of asbestos, a binder of gilsonite and a pigment contrasting in color with the pigment of the base material. The proportions of filler and binder may be the same as those of the base material and consequently the physical properties of the marbleizing stock may be substantially the same as those of the base material. The marbleizing material may be separately worked in a mixer similar to the unit 1 and due to the fact that a relatively small quantity of marbleizing stock is necessary (generally less than 10% relative to the base), which may be considered the critical amount which will not substantially change the color hue of the base material when trimmings are added thereto, as hereinafter described. Sufficient marbleizing stock may be prepared in a relatively short time to serve for the preparation of a large quantity of finished product. The marbleizing stock may be removed from the mixer and may then be caused to cool and harden. It may then be broken into relatively small pieces dependent upon the characteristic appearance to be imparted to the resultant tile.

During the milling of the base material in the mixer 4, and while the material adheres to the roll 6 in the form of a layer 7, a predetermined quantity of the broken marbleizing stock may be sprinkled upon the rotative layer 7. After several revolutions of the roll 6, the marbleizing stock, having substantially the same physical properties as those of the base, softens and being pressed and rubbed by the roll 5 assumes a streaked appearance upon the surface of the layer 7 which truly resembles the whorls and configurations of marble. However, as can readily be seen at 8 in Fig. 4, the marbleizing stock does not extend into the thickness of the finished tile 9 a relatively great distance.

When the desired appearance of the surface of the layer 7 has been obtained, the layer may be stripped from the roll 7 and the slab 10 thus removed may be so folded as to cause the configurations upon the surface of the slab to appear on the outside surfaces of the folded envelope, i. e., the top and bottom of the folded piece. Thus, both faces of the tile are marbleized so that either face may be used interchangeably as the exposed surface. The manner of folding the slab is clearly shown in Fig. 2.

The folded slab 10 may then be introduced into the calender unit 12 comprising rolls 13 and 14 which may also be of hollow construction. However, the rolls 13 and 14 may be maintained at an appreciably lower temperature than the rolls of the units 1 and 4, and consequently, the configurations 11 may not be materially disturbed. In addition, the roll 14 may be maintained at a relatively higher temperature than roll 13 and slab 10 will adhere to roll 14. The slabs 10 may be stripped from the roll 14 and may be conveyed to the cooling unit 15 wherein the temperature of the slabs may be reduced to a desired degree for the punching of the slabs into finished unit tile 9.

The trimmings from the punching or tile cutting operation may be returned to the mixing unit 1 wherein the same may be mixed with the newly introduced stock, and since said trimmings contain only relatively small proportions of stock having the marbleized pigment, the color of the base will not be materially affected over a relatively lengthy period of operation.

It is to be understood, of course, that the hereinbefore described process and apparatus is merely suggested for purposes of illustration and is not to serve as a limitation upon my broad invention which comprises, the process and resulting product formed by imparting a marbleized appearance to composition tile by applying the marbleizing stock to the surface of the base while the base material is in plastic state.

The product comprising my invention possesses all of the desirable wearing qualities of marbleized composition the heretofore manufactured. The depth of the marbleized patterns is sufficient to prevent said patterns wearing off and inasmuch as the marbleizing material possesses like characteristics and may even be identical, with the exception of the pigment used, with the material of the base, said marbleizing patterns will not chip from or be displaced as units from the base as would the usual inlay patterns. The bond which holds the marbleizing material to the base is one resembling coherence rather than adherence or mechanical attachment.

As examples of proportions of binder and filler used in the base material and the marbleized stock may be mentioned approximately 26 percent binder (asphalt or gilsonite) and 74 percent filler (asbestos). As to the fineness of the broken marbleizing stock, very pleasing marble effects may be produced by using pieces which will pass through a ½ inch mesh screen and then distributing this material in definite proportions on the base material in the mixing mill. The amount of bank in the material between the rolls is important and should be kept at a minimum. The percentage of marbleizing stock to base material may vary from 1% to about 10% more or less.

Of course, I do not wish to be limited to the above constants of operation since my invention broadly contemplates variations in proportions of binder and filler throughout a relatively wide range.

I claim as my invention:

1. A method of making marbleized composition material which comprises forming a slab of composition material comprising a filler, binder and pigment and, while said slab is in a plastic state, applying a critical amount of marbleizing material, having characteristics similar to those of the slab but of different color only, to a surface thereof, and subsequently calendering said slab.

2. A method of making marbleized composition material from which tile may be cut, which comprises heating said composition material to a plastic state and forming a slab thereof, applying a critical amount of marbleizing material, having similar characteristics as the slab but of different color only, to a surface of said slab and working said marbleizing material into the surface of the slab and calendering said slab while it is in the plastic state.

3. A method of making marbleized composition material from which tile may be cut which comprises applying a critical amount of marbleizing material comprising a filler, a binder and a pigment to the surface of a heated plastic slab composed of a filler, a binder and different pigment, and incorporating the marbleizing material only into the surfaces of the slab to form an integral structure of substantially uniform construction and subsequently calendering said slab while the same is in the plastic state.

4. A method of making marbleized composition material from which tile may be cut which comprises forming a slab composed of asbestos, asphalt and pigment, heating said slab to soften the asphalt, and applying a critical amount of marbleizing material comprising asbestos, asphalt in similar proportions to that of the slab per se and a different pigment only to the surfaces of the slab, and subsequently calendering said slab while the asphalt is in the softened state.

5. A method of marbleizing permanently fusible plastic tile, which comprises distributing marbleizing pieces of different color and similar composition upon the surface of the base material without substantially diffusing it through the mass of base material, and subsequently calendering said base material and marbleizing pieces.

6. A method of marbleizing permanently fusible plastic tile which comprises distributing marbleizing pieces of different color and similar composition upon the surface of the base material in such a critical amount that will not substantially change the color hue of the base material upon re-mastication, and subsequently calendering said base material and marbleizing pieces.

7. A method of marbleizing permanently fusible plastic tile which comprises distributing not more than 5% of the weight of the base material of a differently colored marbleizing material upon its surface substantially as set forth, and subsequently calendering the base material and marbleizing material.

8. A method of marbleizing permanently fusible plastic tile, which comprises distributing marbleizing pieces of different color and similar composition upon the surface of the base material without appreciably diffusing it through the mass of base material, stripping from the rolls and folding into an envelope and calendering substantially as set forth.

9. A method of marbleizing permanently fusible plastic tile which comprises distributing marbleizing pieces of different color and similar composition upon the surface of the base material in such a critical amount that will not materially change the color hue of the base material upon re-mastication, stripping from the rolls and folding into an envelope and calendering substantially as set forth.

10. A method of marbleizing permanently fusible plastic tile which comprises distributing not more than 5% of the weight of the base material of a differently colored marbleizing material upon its periphery substantially as set forth, stripping from the rolls and folding into an envelope and calendering substantially as set forth.

GEORGE P. HEPPES.